(12) United States Patent
Compton et al.

(10) Patent No.: US 7,542,985 B1
(45) Date of Patent: Jun. 2, 2009

(54) SYSTEM AND METHOD FOR LOG RETRIEVAL PRIORITY

(75) Inventors: Matthew Charles Compton, Tucson, AZ (US); Louis Daniel Echevarria, Tucson, AZ (US); Michael R. Maletich, Tucson, AZ (US); Richard Albert Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/137,895

(22) Filed: Jun. 12, 2008

(51) Int. Cl.
*G06F 7/00* (2006.01)

(52) U.S. Cl. .............................. 707/101; 707/1; 707/2; 707/102; 707/103; 709/203; 709/204

(58) Field of Classification Search ............... 707/1, 707/2, 101, 102, 103; 709/203, 204
See application file for complete search history.

(56) References Cited

U.S. PATENT DOCUMENTS

| | | | | |
|---|---|---|---|---|
| 5,872,966 A | * | 2/1999 | Burg | .......................... 719/313 |
| 5,892,917 A | * | 4/1999 | Myerson | ..................... 709/224 |
| 2001/0043227 A1 | * | 11/2001 | Shaw | ......................... 345/582 |
| 2006/0004698 A1 | * | 1/2006 | Pyhalammi et al. | ............ 707/2 |

\* cited by examiner

*Primary Examiner*—Don Wong
*Assistant Examiner*—Tuan-Khanh Phan
(74) *Attorney, Agent, or Firm*—Locke, Lord, Bissell & Liddell, LLP

(57) ABSTRACT

A method of establishing a prioritization for transmission of log files from a remote computer to a central repository involves receiving a first log file package at the central repository from the remote computer, the first log file package having been generated in response to a predetermined event at the remote computer, tracking which logs of the first log file package are utilized at the central repository, updating priority of the logs, designating additional log files that were not part of the first log file package that are to be included in a second log file package, sending a list of the log priorities and the designated log files from the central repository to the remote computer, and receiving the second log file package at the central repository from the remote computer.

1 Claim, 2 Drawing Sheets

All Sub Packages are limited to 1024 KB in size maximum

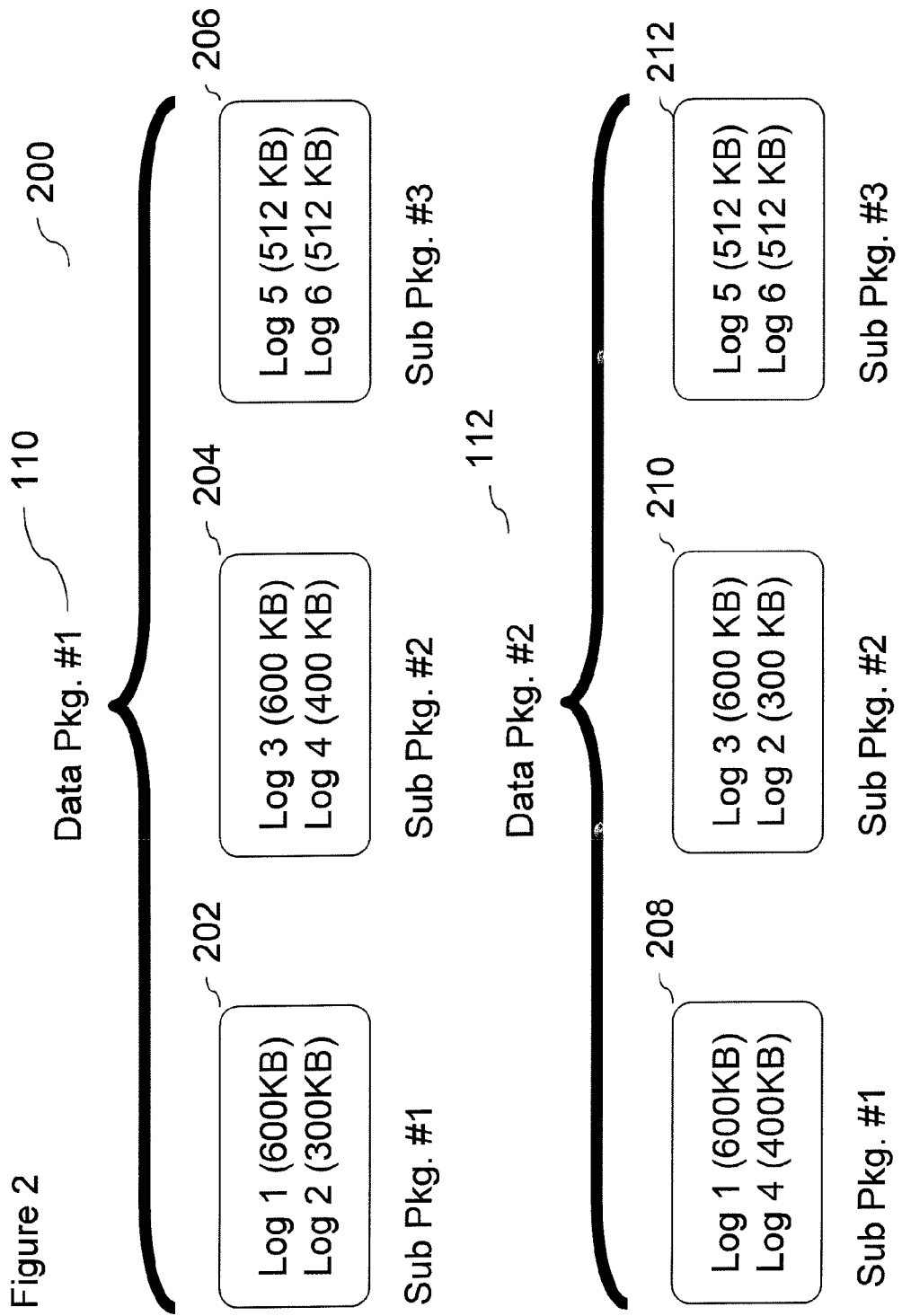

SYSTEM AND METHOD FOR LOG RETRIEVAL PRIORITY

FIELD OF THE DISCLOSURE

The disclosure relates to computers and, more particularity to file retrieval.

BACKGROUND

Computer systems today are able to record and store more information logs relating to their internal status or error conditions than ever before. When a computer system encounters a problem, finding the correct informational log needed to diagnose and correct the issue is an increasingly difficult task.

Packages of logs on a remote computer may be transmitted to what is interchangeably referred to herein as either a "home" computer or a central repository via various communication media, where support specialists may analyze the problem or event that prompted the transmission. The transmission is initiated by the remote computer as a transmission of log files as data packages to the central repository. Through existing log transmission methodologies, it is typical to identify and transmit common logging files that may or may not be useful to support personnel after a problem has been realized. Since these common files are sent home indiscriminately, regardless of what type of error is detected, there is no adaptation to different types of errors.

Limiting factors exist that prevent sending more logs in data packages. These factors include, for example, the connection speeds from the remote machine and the central repository and the cost of storing data files for long term analysis.

Because of these limiting factors, there are situations where the correct logs are not sent in the data package, resulting in support center's need to remotely connect to a machine or in a worse case scenario, send a person to the remote site to retrieve the required logs. This situation results in higher support costs.

SUMMARY

The present disclosure relates to a method for dynamically altering relative priorities of log files, such that for any given log transmission generating event, higher priority log files will be transmitted earlier than lesser priority logs. Specifically, relevance of log files is determined by actual usage metrics of the support personnel viewing the logs. The log files that are used the most are given a higher relative priority than other log files. These priorities are communicated back to the remote computer, which will tailor any future call home packages to transmit the relevant and highest priority logs first. The advantages inherent to this method include transmission of log files most useful to support personnel at the home computer or central repository.

One example involves a method of establishing a prioritization for transmission of log files from a remote computer to a central repository, the method comprising: receiving a first log file package at the central repository from the remote computer, the first log file package having been generated in response to a predetermined event at the remote computer; tracking, by frequency of use, which logs of the first log file package are utilized at the central repository; updating priority of the logs such that more frequently used logs are assigned a higher priority, such that the ordering of logs within a second log file package are in order of priority based upon usage frequency, and in the case where log files receive an identical priority, the size of a log file is used to determine which of the identical priority log files has a higher priority in the second call home package; designating additional log files that were not part of the first log file package to be included in the second log file package, the additional log files to be given a lowest priority; sending a list of the log priorities and the designated log files from the central repository to the remote computer; and receiving the second log file package at the central repository from the remote computer, the second log file package having been generated in response to the predetermined event at the remote computer.

BRIEF DESCRIPTION OF THE DRAWINGS

FIG. 2 is a simplified diagram of an example of dividing log data packages into multiple sub-packages.

DETAILED DESCRIPTION

Figure 1:
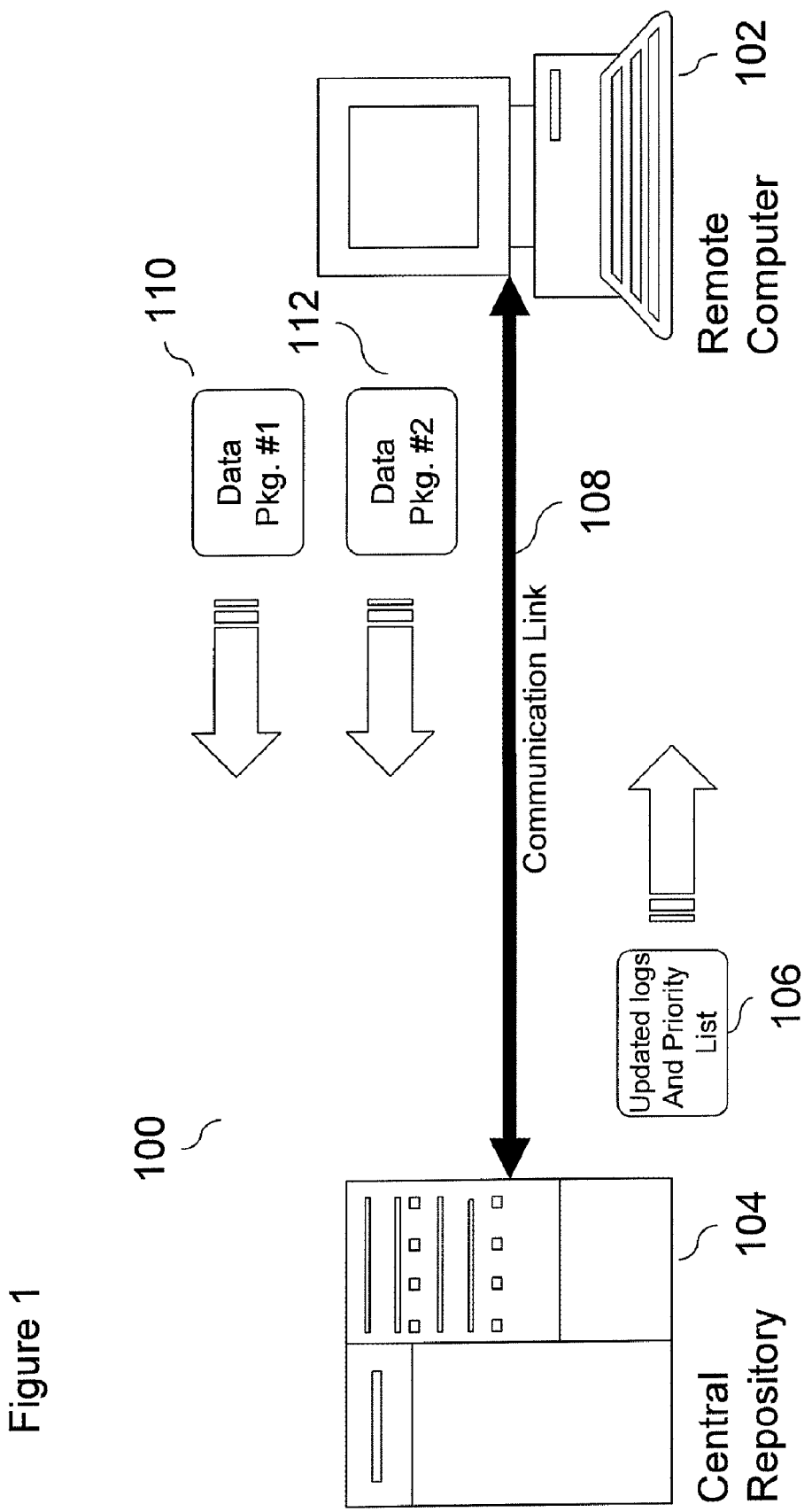
FIG. 1 is a simplified diagram of an example configuration for transmitting log data packages and updating log priorities as described herein.

FIG. 1 is a simplified diagram of an example configuration (100) for transmitting log data packages and updating log priorities as described herein. Presuming that some predetermined event occurs at a remote computer (102), a first data package (110) is transmitted in response from the remote computer to the home computer or central repository (104) through a communications link (108) between the two computers. The link may be of various types, such as a phone line, high speed internet or wireless media.

Data packages may be generated in response to errors on the remote computer or also non-error conditions such as a periodic status check. A data package may contain multiple log files that provide information regarding the state of the remote computer. Each log file within the data package has associated with it a priority rating. The priority rating for a log file may be modified based on the measured amount usage of the log file by the support personnel at the central depository (104), as they work to investigate the underlying event that caused the log transmission.

The logs files are typically stored within a database on the central repository (104). When a particular log file is opened through the data repository by support personnel, the type of package the file belongs to is determined. If the package is not an error package, the system is updated with the type of non-error package and the log file retrieved, which updates the log's priority in the system. If the package is an error-package, the system will determine the reason why the call home was generated, which in many cases is associated with an error code, and will update the log priority for that error code once the log is opened through the data repository.

Updating a log file's priority involves tracking which logs are being utilized in the data repository and how many different people open or download the file, as well as how many times a single person opens or downloads the file. As the number of hits increases, the priority of this file in association with this specific error or event will increase.

Note however, that in all log transmissions, there is a set of required files. These files will always be present in the log transmission records and will be included in the first data package sent home. Such files may include, for example, basic system configuration information of the remote computer. When log files have moved up in the list in priority, they will not be able to surpass the required files that are needed to create the log transmission record properly in the data repository.

Thus the update of priority may occur for multiple log files within the data package, depending upon their usage pattern at the central repository (104). When the priority of log(s) has been changed, the central repository (104) will send the updated logs and priority list (106) back to the remote computer (102) via the communication link (108).

Once the updated priority list (106) is in the remote machine (102), its log transmission process will reference this list. When the event that triggered the first data package (110) transmission occurs again, the remote machine will follow the log retrieval process defined by the support personnel within the list (106), and send higher priority logs earlier in the next data package (112). If the event that triggers a future log transmission is not one for which the home computer sent an updated priority list, the remote machine will follow any current existing procedures for collecting logs.

In addition to updating priority of log files existing in the transmitted data package, it may sometimes be necessary to add additional log files to the package. The system will also allow for the support personnel to add log files that they manually retrieve. It will update the list of log files in the package required and will add the additional log file to end of the priority list. For example, if the first data package (110) lacked certain useful logs, support personnel at the central repository (104) may designate additional logs that should have been sent in response to the event on the remote computer (102) that triggered the first data package (110). These additional logs are likewise communicated to the remote computer (102) via the updated logs and priority list (106). Accordingly, if the triggering event occurs again, any subsequent data package for that event (112) will contain the additionally designated log files.

When the priorities of log files are identical, they will be ordered by their size as a tiebreaker. This is most useful in the situation where a single data package is broken into multiple smaller sub-packages for ease of transmission on a slow connection between the remote machine and the central repository. By breaking the data packages into these multiple smaller packages, the support personnel are able to receive and read the smaller packages as they arrive home individually, rather than wait for a complete data package to be received in its entirety.

Sub-packages are of a predetermined size. Log files are added to sub-packages until their capacities no longer will allow for more files to be added to the sub-package. Therefore, if multiple log files of identical priority were al candidates to fit within a nearly full sub-package, the largest such log file that can fit within the remaining space within the sub-package will be selected for that sub-package. The remaining log files with the identical priority will be first to be added to the next package and will arrive in the data repository in the next wave of files.

FIG. 2 is a simplified diagram of an example (200) of dividing log data packages into multiple sub-packages. In this hypothetical scenario, a first data package (110) is parsed into three sub-packages (202, 204 and 206), where each sub-package contains two log files and a sub-package is constrained to be 1024 KB in size. This may be done, for example, to facilitate transmission of the sub-packages over a slow communications link (108). The first set of sub-packages is transmitted from the remote computer (102) to the central repository (104), in the manner shown in FIG. 1. Analysis of the usage metrics of the log files at the home computer may result in a reordering of the priorities of the log files. In this example, the more favorable priority order is determined to be log 1, log 3 or log 4 (log 3 and log 4 having an identical priority rating), log 2, log 5 and then log 6, where log 1 is of the highest priority and log 6 the least. As shown in FIG. 1, the central repository (104) will send the updated logs and priority list (106) back to the remote computer (102) via the communication link (108) in order to communicate the updated priority information. If the event that triggered the first data package occurs again, a second data package (112) will be generated at the remote computer (102).

Referring back to FIG. 2, the second log data package (112) is divided into sub-packages as well (208, 210 and 212). If the ordering of log files within the sub-packages strictly follows what was communicated in the updated logs and priority list, a problem arises. The updated priority order was determined to be log 1, log 3 or log 4, log 2, log 5 and then log 6. However, by placing log 1 and log 3 into the first sub-package (208), the maximum size of the sub-package (1024 KB) is exceeded, because log 1 and log 3 have a combined size of 1200 KB. Then again, log 3 and log 4 have identical priorities. A sub-package containing log 1 and log 4 is only 1000 KB in size; below the maximum size. Therefore, based upon the identical priority of log 3 and log 4, the size of log 3 and log 4, and the most efficient loading of the sub-packages, the first sub package (208) should contain log 1 and log 4. Log 3 will be transmitted in the subsequent sub-package (210).

Of course, FIG. 2 represents only a simplified diagram of an example of dividing log data packages into multiple sub-packages. Depending upon the needs of the support personnel and system environment, the desired size and number of sub-packages that a data package may be divided into may vary considerably. Alternatively, conditions may favor that a data package be transmitted in its entirety without any division whatsoever.

It will be appreciated by persons skilled in the art that the present disclosure is not limited to what has been particularly shown and described hereinabove. Rather, the scope of the present disclosure is defined by the claims which follow. It should further be understood that the above description is only representative of illustrative examples of embodiments. For the reader's convenience, the above description has focused on a representative sample of possible embodiments, a sample that teaches the principles of the present disclosure. Other embodiments may result from a different combination of portions of different embodiments.

The description has not attempted to exhaustively enumerate all possible variations. The alternate embodiments may not have been presented for a specific portion of the disclosure, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent.

What is claimed is:

1. A method of establishing a prioritization for transmission of log files from a remote computer to a central repository, the method comprising:

receiving a first log file package at the central repository from the remote computer, the first log file package having been generated in response to a predetermined event at the remote computer;

tracking, by frequency of use, which logs of the first log file package are utilized at the central repository;

updating priority of logs within the first log file package such that the logs more frequently used at the central repository are assigned a higher priority, such that the ordering of logs within a second log file package are in order of priority based upon usage frequency, and in the case where log files receive an identical priority, the size of a log is used to determine which of the identical priority log files has a higher priority in the second log file package;

designating additional log files that were not part of the first log file package to be included in the second log file package, the additional log files to be given a lowest priority;

sending a list of the log priorities and the designated log files from the central repository to the remote computer; and receiving the second log file package at the central repository from the remote computer, the second log file package having been generated in response to the predetermined event at the remote computer.

* * * * *